United States Patent
Kumar

(10) Patent No.: US 12,197,438 B2
(45) Date of Patent: Jan. 14, 2025

(54) DATA MANIPULATION LANGUAGE PARSER SYSTEM AND METHOD FOR ENTITY RESOLUTION

(71) Applicant: LiveRamp, Inc., San Francisco, CA (US)

(72) Inventor: Shirish Kumar, Saratoga, CA (US)

(73) Assignee: LiveRamp, Inc., San Francisco, CA (US)

( * ) Notice: Subject to any disclaimer, the term of this patent is extended or adjusted under 35 U.S.C. 154(b) by 0 days.

(21) Appl. No.: 18/268,908

(22) PCT Filed: Dec. 29, 2021

(86) PCT No.: PCT/US2021/065431
§ 371 (c)(1),
(2) Date: Jun. 21, 2023

(87) PCT Pub. No.: WO2022/147067
PCT Pub. Date: Jul. 7, 2022

(65) Prior Publication Data
US 2024/0045864 A1    Feb. 8, 2024

Related U.S. Application Data

(60) Provisional application No. 63/133,417, filed on Jan. 4, 2021.

(51) Int. Cl.
*G06F 16/2453* (2019.01)

(52) U.S. Cl.
CPC .............................. *G06F 16/24542* (2019.01)

(58) Field of Classification Search
CPC ....................... G06F 16/24542; G06F 16/2453
See application file for complete search history.

(56) References Cited

U.S. PATENT DOCUMENTS

| | | | |
|---|---|---|---|
| 10,467,322 B1* | 11/2019 | Cao | G06F 17/00 |
| 10,572,817 B2* | 2/2020 | Kardes | G06F 16/9024 |
| 2011/0022618 A1 | 1/2011 | Thatte et al. | |
| 2011/0313979 A1* | 12/2011 | Roberts | G06F 16/2365 707/690 |
| 2018/0218069 A1* | 8/2018 | Rege | G06F 16/9014 |
| 2019/0102437 A1* | 4/2019 | Patthak | G06F 16/2453 |
| 2020/0210395 A1* | 7/2020 | Molini | G06F 16/219 |

OTHER PUBLICATIONS

Extended European search report for application No. 21916384.7 (dated Oct. 23, 2024).

* cited by examiner

*Primary Examiner* — Cheyne D Ly

(57) ABSTRACT

A computerized method for implementing a matching platform for entities includes a real-time processing layer using real-time linking on an input data stream, and a high-throughput layer linking entities from a batch data source stream. The real-time linking results are stored in a state change store and the high-throughput linking results are stored in a state store. On-demand linking uses the state change store and the state store. A lambda switch ensures that the entity states remain consistent when the on-demand linking switches from an older generation of the state store and the stage change store to a newer generation of the state store and the state change store. These stores are implemented in an entity database that parses queries into instructions and creates an instruction stream to control entity matching.

15 Claims, 18 Drawing Sheets

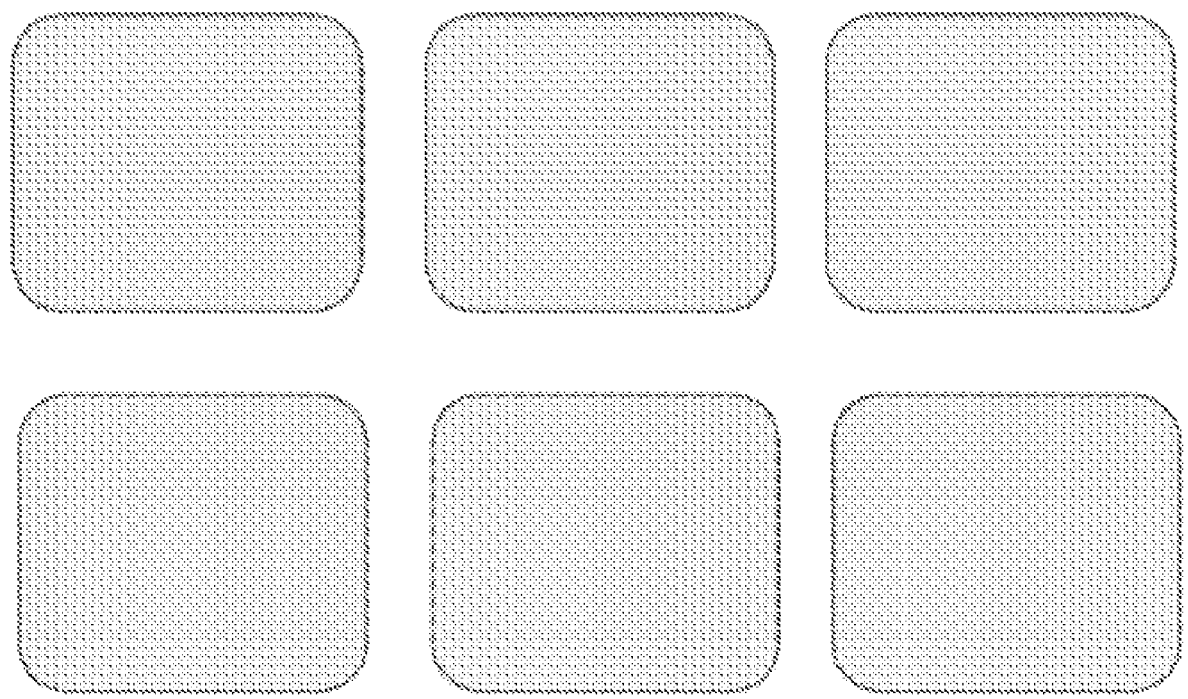
Groups of near neighbors
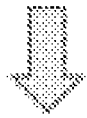
Set of Matched Pairs
FIGURE 4 e1 matches e2
e2 matches e3
e4 matches e4
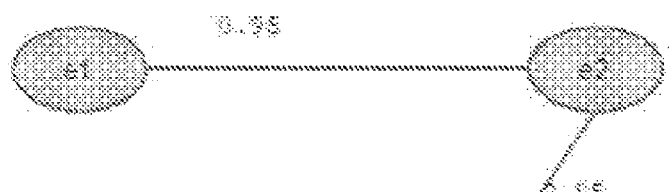
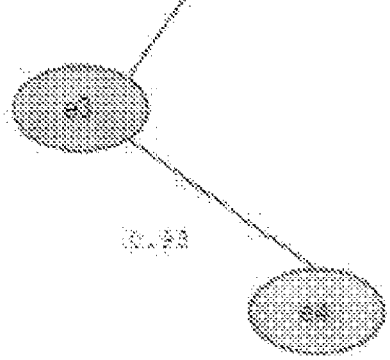
e1, e2, e3, e4 belong
to the same cluster
500
FIGURE 5 e1 matches e2
e2 matches e3
e4 matches e4
e3 does not match e1
e2 does not match e4
e1 does not match e4

Where should e2 go? Two possibilities. Split at X or Split at Y.

600

```
Run A:
ID1: {e1, e2, e3, e4} -> C1
ID2: {e5, e6, e7} -> C2

Run B:
{e1, e2, e3} -> B1
{e5, e6, e7, e9} -> B2
{e4, e8} -> B3 e4 cluster changed. e8 & e9
are new.
What should be the ID of B1
and B3?

Probably:
B1 -> ID1,
B2 -> ID2, and
B3 -> ID3 (new ID)
```

700

```
// returns zip_code with the highest cardinality.
SELECT MOST_FREQUENT(zip_code)

// returns a vector of monthly payment made by the entity (customer)
SELECT MONTHLY(payment)

// runs the spend inference function on the data return by query names spend_features
INFER(spend, model_id) as inferred_spend FROM spend_features
SELECT spend, transaction_timestamp, zip_code // Date when the entity was last active
SELECT LAST_ACTIVE()

// Date when the entity was first active
SELECT FIRST_ACTIVE()
```

```
DML := <create_statement> | <resolve_statement> create_statement := create entity <entity_name>
    identified by <trait_list>
    using blocking index <blocking_indices> and
    (matching function matching_fuction(<trait_list>, <trait_list>) |
        matching on <trait_comparators>)

resolve_statement := resolve entity <entity_name> from <data_sources> entity_name:= alphanumeric name data_sources := <data_source> | <data_source>, <data_sources>
data_source := <protocol>://<file_location>
protocol := gs | s3 | hdfs | file
file_location := file path trait_list := <trait> | <trait>, <trait_list>
trait:= alphanumeric name blocking_indices := <blocking_index> | <blocking_index>, <blocking_indices>
blocking_index := <blocking_function>(<trait_list>)
blocking_function := name of the blocking function trait_comparators := <trait_comparator> | <trait_comparator>, <trait_comparators>
trait_comparator := <trait> <comparator> <trait>
comparator := == | != | >= | <= | > | <
```

```
entity_query := <match_statement> match_statement := match entity <entity_name> on <traitset_list> entity_name := alphanumeric name traitset_list := (<trait_list>) | (<trait_list>), <traitset_list> trait_list := <trait> | <trait>, <trait_list> trait := alphanumeric name
```

DATA MANIPULATION LANGUAGE PARSER SYSTEM AND METHOD FOR ENTITY RESOLUTION

CROSS-REFERENCE TO RELATED APPLICATIONS

This application claims priority to U.S. Provisional Patent Application No. 63/133,417 filed on 4 Jan. 2021. This provisional application is hereby incorporated by reference in its entirety.

BACKGROUND

An entity can be a unique body with a specific set of descriptive traits. For example, in the retail business, an individual customer (person) and household are each an entity. In the insurance business, customers, agents, and products are a few examples of entities. Similarly, in the healthcare industry, patients, providers, and healthcare facilities are a few examples of entities.

An entity can also be described by multiple traits. For example, a person entity can be represented by traits such as name, address, email address, phone number, and credit card number. An individual trait itself can have different values. For example, a person can have two names, one before marriage and one after marriage. Also, a person's address may have multiple values. Some of the trait values can change over time for example the phone number trait can change over time for a person and may only be valid up to a certain time. Given these variations (multiple traits and multiple values for a trait), a person entity can have several valid representations. Similarly, a business entity can have several addresses and phone numbers or be known by various names.

In business, for various reasons, there can be a need to uniquely identify (also known as resolve), canonicalize (i.e., standardize the format, choose best values), persist (i.e., save indefinitely), and query entities from a set of records gathered from multiple sources or systems.

Current database technologies (such as relational databases, document-oriented databases, and key-value pair databases) do not support the notion of entity identification, canonicalization, persisting, and querying. Accordingly, improvements are desired for a new type of entity-oriented database that can be used to help enterprises resolve, canonicalize, persist, and query entities. It is also desired to achieve this using a declarative language.

SUMMARY

An entity database system in certain embodiments may consist of a component to efficiently resolve entities from a set a records and update the resolution upon receiving new records; a component to canonicalize the trait values to support various entity representations; a component to persist the entities; a component to query entities; and a declarative language, which provides a means for users to interact with the entity database system for resolution, canonicalization, or querying.

In certain embodiments, the resolution engine component may include a real-time processing layer using real-time linking on an input data stream, and a high-throughput layer linking entities from a batch data source stream. These two layers perform entity resolution. The resolved entities are then canonicalized by the canonicalization engine component.

In certain embodiments, the real-time linking results are persisted in a state change store and the high-throughput linking results are persisted in a state store. On-demand linking uses the state change store and the state store.

In certain embodiments, a lambda switch ensures that the entity states remain consistent when the on-demand linking switches from an older generation of the state store and the stage change store to a newer generation of the state store and the state change store. These stores are implemented in an entity database that parses queries into instructions and creates an instruction stream to control entity matching.

In certain embodiments, the entity database includes DML and query parsers feeding to an entity resolution engine. The entity resolution engine extracts traits from incoming records or instructions, performs near-neighbor generation to connect similar or identical entities, performs pairwise matching to further define entity relationships, performs transitive closure to form clusters that may pertain to the same entity, splits clusters that are overmatched, and then uses a stable ID assignment system to minimize the reassignment of identifiers based on newly received information.

DRAWINGS

FIG. 4 illustrates an example of a schematic of a pairwise matching process, according to some embodiments.

FIG. 5 illustrates an example schematic of a transitive closure process, according to some embodiments.

FIG. 10 illustrates an example schematic of a composite profile creation, according to some embodiments.

FIG. 13 illustrates an example DML grammar, according to some embodiments.

FIG. 14 illustrates an example query-statement grammar, according to some embodiments.

Figure 1A:
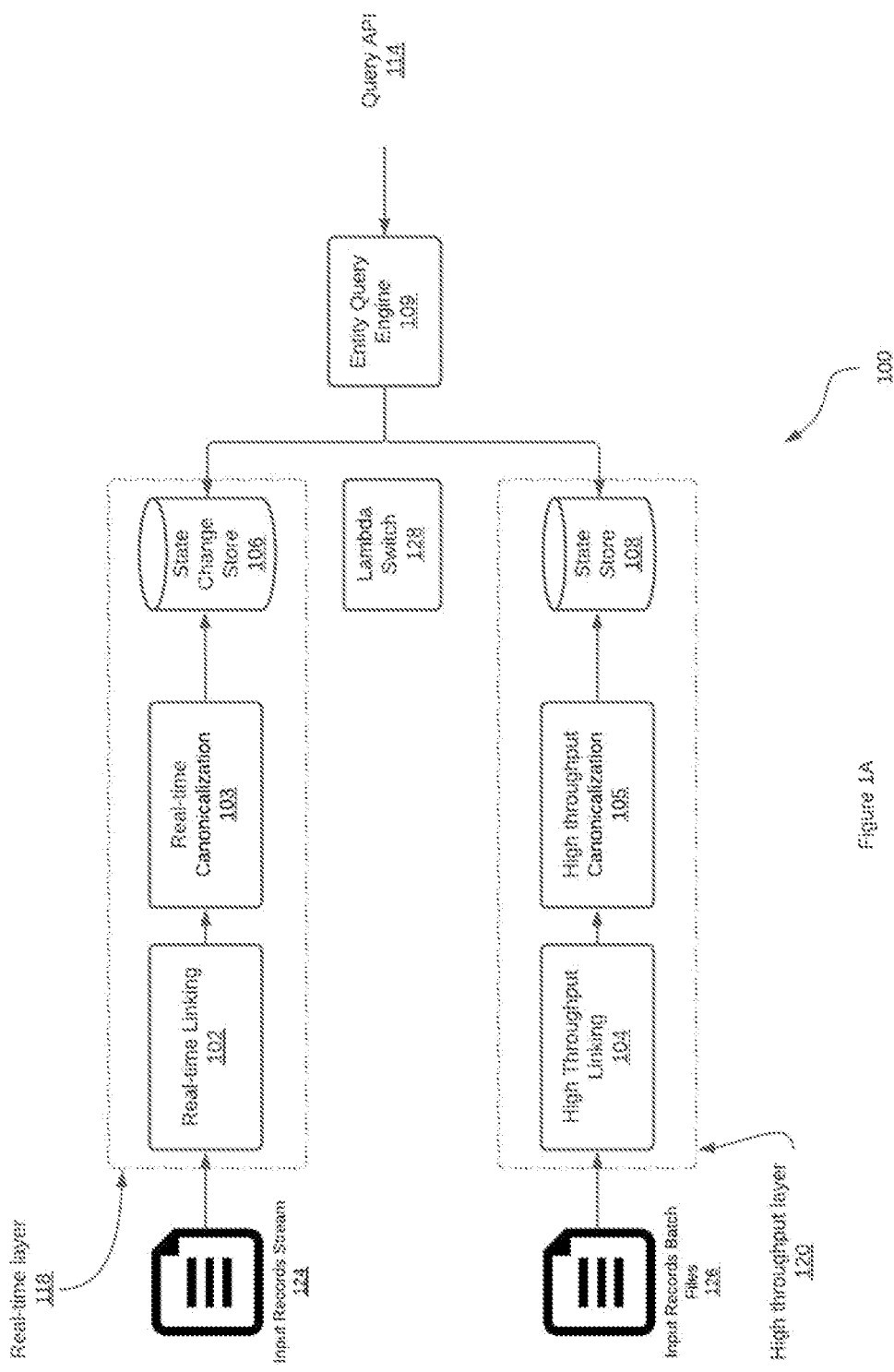
FIG. 1A illustrates an example system for implementing a matching platform for entities, according to some embodiments.

The Figures described above are a representative set and are not exhaustive with respect to embodying the invention.

DESCRIPTION

Disclosed are a system, method, and article of matching platform for entities. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment, or according to some embodiments. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can be an application specific computing interface to allow third parties to extend the functionality of a software application.

Bidirectional Encoder Representations from Transformers (BERT) is a transformer-based machine learning technique for natural language processing (NLP) pre-training.

Cloud computing can be the on-demand availability of computer system resources, especially data storage and computing power, without direct active management by the end user.

Correlation clustering provides a method for clustering a set of objects into the optimum number of clusters without specifying that number in advance.

Data manipulation language (DML) is a family of computer languages used by computer programs or database users to retrieve, insert, delete, and update data in a database.

Entity refers to a real-world artifact such as, for example, a person, company, product, parts, etc. For example, a person can take different forms such as: customer, patient, user, etc. Similarly, a company can be a business entity that can be, for example, a merchant, supplier, provider of a service, etc.

Entity Query Language (EQL) is a storage-independent query language that follows similar syntax to SQL. EQL enables users to describe operations that can be performed on an entity (e.g., customers). These operations include, for example, aggregations, union, intersections, and best-value calculations. EQL is parsed and translated into code. The code is then executed on the entity data to calculate the results. For example, a customer of a retail company can be defined by name, addresses (one or more), emails, telephone numbers, shopping locations, web site cookies, website activities, and the like.

High-throughput linking can use a software module that creates clusters of records that correspond to real-world entities. The software module can process large amounts of data (e.g., in the range of hundreds of terabytes) stored on disk in one batch. In certain examples it can be configured to run every few hours.

Identifying attributes of an entity are the attributes that act as a contributing factor to identify a real-world entity.

Linking can include the task of identifying records that belong to the same real-world entity. Linking creates clusters of records that belong to real-world entities.

Machine learning (ML) is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, among other things, decision tree learning, association rule learning, artificial neural networks, inductive logic programming, support vector machines, clustering, Bayesian networks, reinforcement learning, representation learning, similarity and metric learning, and/or sparse dictionary learning. Random forests (RF) (e.g., random decision forests) are an ensemble learning method for classification, regression, and other tasks, that operate by constructing a multitude of decision trees at training time and outputting the class that is the mode of the classes (e.g., classification) or mean prediction (e.g., regression) of the individual trees. RFs can correct for decision trees' habit of overfitting to their training set. Deep learning is a family of machine learning methods based on learning data representations. Learning can be supervised, semi-supervised or unsupervised.

Maximum likelihood estimation (MLE) is a method of estimating the parameters of a probability distribution by maximizing a likelihood function, so that under the assumed statistical model the observed data is most probable. The point in the parameter space that maximizes the likelihood function is called the maximum likelihood estimate.

Near-neighbor is a group of entities selected from the universe of entities that likely belong to the same real-world entity.

On-demand linking can use a software module that provides an API which can be called by an external software application. The external software application can call the API with the records that it wants to be linked.

Real-time linking can use a software module that creates clusters of records that belong to real world entities. This software module may continuously consume data from a data stream in micro-batch intervals (e.g., of less than a minute) and processes micro-batches of data as they arrive in the data stream. High-throughput linking can be meant to process large amounts of data, whereas real-time linking can be meant to process small data quickly (e.g., on the order of less than a minute).

Structured Query Language (SQL) is a domain-specific computer programming language designed for managing data held in a relational database management system, or for stream processing in a relational data stream management system.

Transfer learning (TL) uses machine learning (ML) to focus on storing knowledge gained while solving one problem and applying it to a different but related problem.

Transitive closure of a binary relation R on a set X is the smallest relation on X that contains R and is transitive.

Example Methods and Systems

Figure 1B:
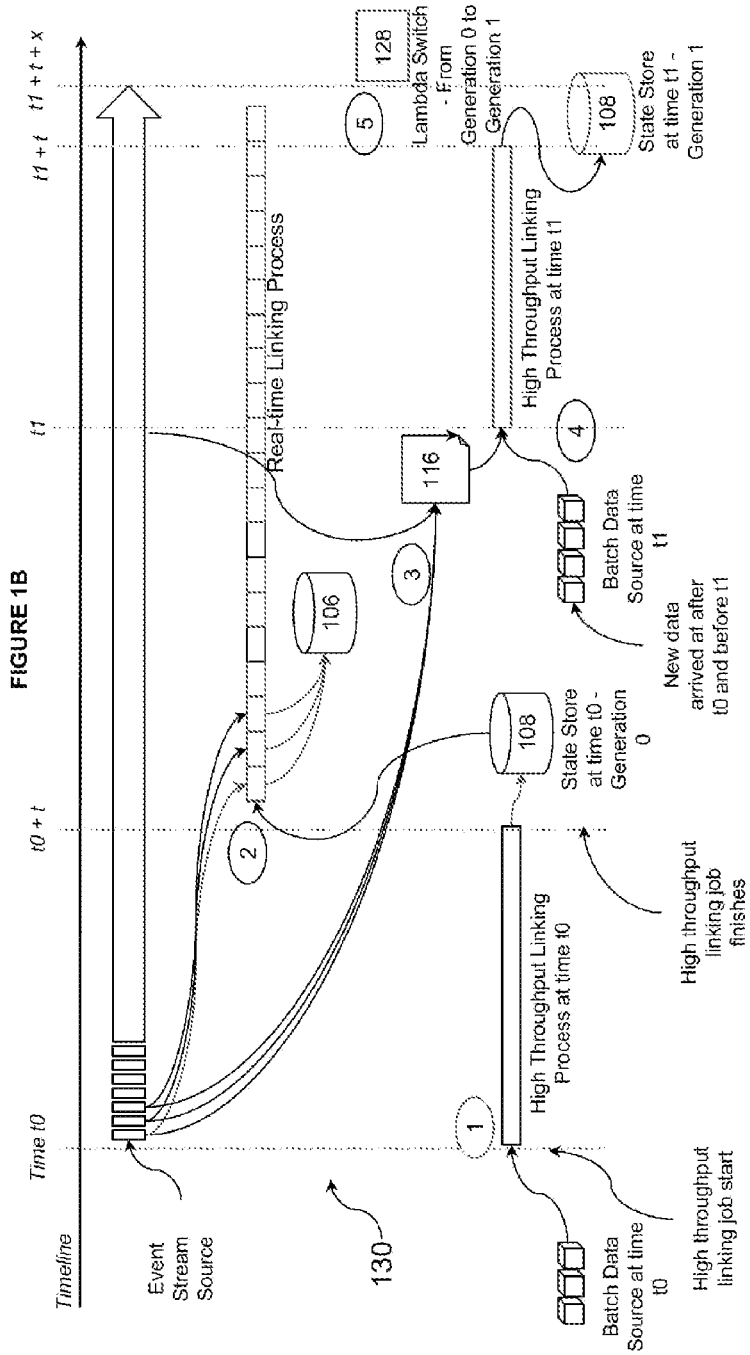
FIG. 1B illustrates an example process for implementing a matching platform for entities, according to some embodiments.
Figure 1C:
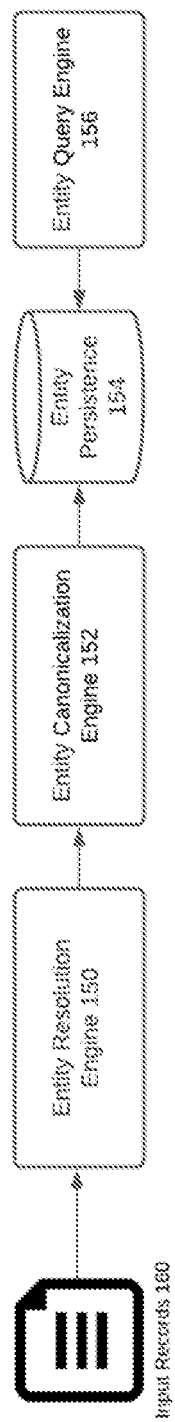
FIG. 1C illustrates an overall entity database system.

As shown in FIG. 1C, an overall entity database system consists of the following components. Resolution component/engine 150 efficiently resolves entities from a set of records 160 and updates the resolution upon receiving new records. Canonicalization component/engine 152 canonicalizes the trait values to support various entity representations. Persistence component 154 persists the entities. Query component/engine 156 queries entities. A parser for supporting a declarative language, which is integrated with resolution component/engine 150, canonicalization component/engine 152, and query component/engine 156, provides users with a means to interact with the entity database system for resolution, canonicalization, or querying.

FIG. 1A illustrates an example system 100 for implementing an entity database system, according to some embodiments. It is noted that entities can include, for example, customer data about a person, company, product, parts, etc. System 100 can be used for the task of identifying records that belong to the same real-world entity (e.g., linking processes, etc.), performing canonicalization, persisting, and querying entities.

As shown, system 100 includes a high-throughput linking 104 and canonicalizing 105 that stores its output to a state store 108. This can be performed in high-throughput layer 120. A high-throughput layer 120 can be a software module that can process large amounts of data (e.g., hundreds of terabytes) using a cluster of machines (e.g. computer hardware and/or software systems). This cluster of machines may operate in a traditional local computing environment or in a cloud-based virtual computing environment.

System 100 includes a real-time linking 102 and canonicalizing 103 that stores its output to a state change store 106. This can be performed in real-time layer 118.

System 100 includes an entity query engine 109 that reads from the state store 108 and stage change store 106.

It is noted that, in some example embodiments, a layer can be a software module that performs a well-defined set of tasks. A layer can define a list of interfaces and APIs through which other modules can interact with it.

A batch data source 126 can be from a data storage which stores large amounts of data on storage disks. An event stream 124 (e.g. a real-time data source and/or streaming data source) includes data that is delivered as a continuous stream of records.

A high-throughput layer 120 can be a software module that can process large amounts of data (e.g. hundreds of terabytes) using a cluster of machines (e.g. computer hardware and/or software systems). High-throughput layer 120 can read data from batch data sources and performs linking and canonicalization at a defined interval usually every few hours or every few days. Depending on the input data size, the processing may take a few hours to a few days.

A real-time layer 118 can be a software module that reads data from an event stream and performs linking and canonicalization every few seconds. This process usually takes less than a few seconds.

An Entity Query Engine 109 can be a software module that performs queries in response to a user query from an external application. Based on the query, query engine 109 reads both state store 108 and state change store 106 and performs matching and returns the matched results back.

System 100 can also interact with an application configuration layer (not shown). In some examples, an application configuration layer can be a software module that is used to change the configuration/behavior of the high-throughput layer 120, as high-throughput layer 120 processes large amounts of data in batches. Batch intervals can vary from a few hours, a day, etc. This can be a customization on top of the data processing layers.

A lambda switch 128 ensures that entities' state remain consistent as it switches from an old generation of state to a new generation. Lambda switch 128 is configured to ensure that a set of states of the entities remain consistent when the on-demand linking switches a serving from an older generation of state store 106 and the state change store 106 to a new generation of the state store 108 and the state change store 106. Lambda switch 128 provides for the query engine layer 109 to continue to query without any downtime. The lambda switch 128 provides functionality that ensures that both real-time layer 118 and high-throughput layer 120 continue to work seamlessly. Accordingly, lambda switch 128 provides the ability to process massive amounts of data as well as the ability to reduce latency while processing real-time data.

System 100 performs both high-throughput linking 104 and real-time linking 102. In some examples, high-throughput layer 120 performs linking of large batches of data every few hours, while real-time linking 102 performs linking on a data stream as the stream is received. High-throughput 104 linking ensures the accuracy and comprehensiveness of the linking. Real-time linking 102 minimizes the latency of stream data. System 100 combines these two layers (i.e. high-throughput 104 and real-time linking 102) to provide the benefit of accuracy, comprehensiveness, and low latency. Lambda switch 128 can be the software module that ensures that data remains consistent across these two layers.

Entity matching of system 100 can be used to resolve the following, for example: attribute ambiguity (e.g., same name may refer to different individuals); missing value(s) (e.g., missing email, address); data entry errors (e.g., misspelled names, extra digits); changing attributes (e.g., name change, address change); multi-relational (e.g., family relation); etc. System 100 can be used to bring all the variations of a real-world entity together. Accordingly, entities (e.g. any type of real-world entity, such as, a person, a merchant, etc.) can be matched using system 100.

It is noted that the linking process can be repeated using different matching rules to generate different variations of the matched entities or match different types of entities. It can also be used to generate relationships between entities. These relationships can be hierarchical or associative. For example, linking can resolve subsidiary relationships between a parent and its subsidiaries.

FIG. 1B illustrates an example process 130 for implementing a matching platform for entities, according to some embodiments. In step 1, high-throughput linking 104 reads data from batch data sources at time t0. High-throughput linking 104 performs linking and saves the output in the state store 108. The state store 108 stores the states of all entities at time t0. This output can be labeled state Generation 0. Process 130 can mark this as the current state store 108.

In step 2, real-time linking 102 is implemented as a continuous process. In one example, real-time linking 102 reads data from the event stream every few seconds (e.g., in micro batches). In alternative embodiments, the time at which the event stream is read may be varied. Real-time linking 102 reads data from the state store and performs linking, applies the change on the state of the affected entities, and saves the results in the stage change store 106. The output of real-time linking 102 represents the latest state of an entity.

At step 3, when an external application calls API 114 to perform a query about an entity, API 114 calls the entity query engine 109. Entity query engine 109 reads both the state store 108 (e.g., includes generation 0) and state change store 106. Based on what is read, Entity Query Engine 109 performs linking and returns the results.

In step 4, at time t1 (e.g., which can be after a few hours or few days after t0) the high-throughput linking 104 runs. At this point in time, process 100 reads the batch data sources at time t1 and the event sink 116. This run produces a new state store marked as generation 1. This generation of the state stores contains the states of all entities constructed using the data received from both batch and real-time sources at time t1.

In step 5, at time t1+t+x, lambda switch 128 invalidates generation 0 of the state store 108, adjusts the state change store, and makes generation 1 the current state store. After the switch, on-demand linking 110 switches to generation 1 of the state store to serve any queries. Lambda switch 128 can serve two purposes here. First, lambda switch 128 ensures that the switch from generation 0 to generation 1 (e.g., the next generation) does not make states of entities inconsistent. Second, lambda switch 128 ensures that there is no downtime for on-demand linking 110 (e.g., on-demand linking 110 can continue serving an external application).

Figure 2:
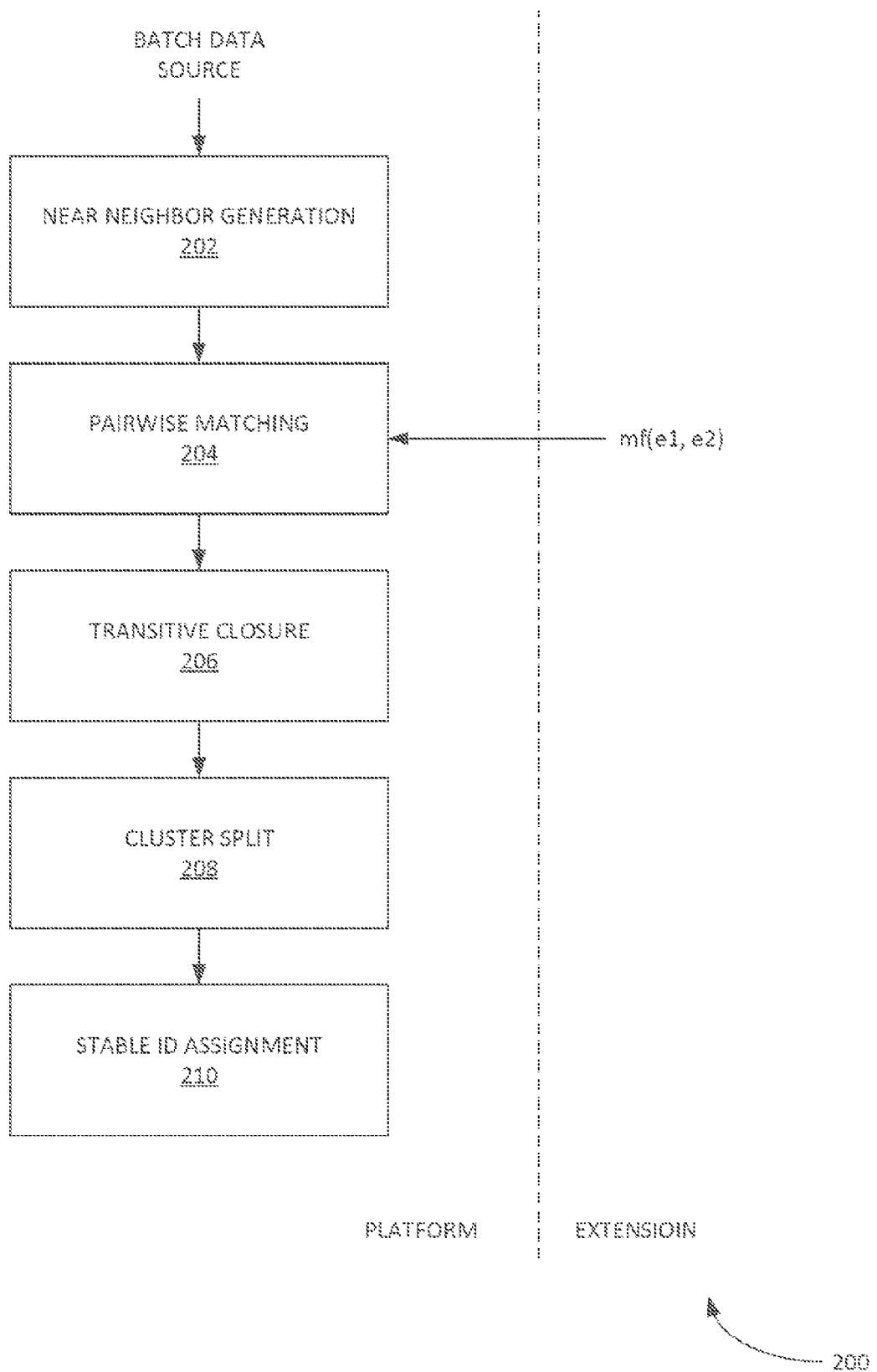
FIG. 2 illustrates an example process for implementing high-throughput linking in a matching platform for entities, according to some embodiments.

FIG. 2 illustrates an example process 200 for implementing high-throughput linking in a matching platform for entities, according to some embodiments. Process 200 illustrates various steps implemented for a linking process. High-throughput linking can be tuned toward accuracy, etc. In near neighbor generation step 202, process 200 can implement near neighbor generations. Pairwise matching can be implemented within each cluster. This can reduce the number of iterations needed to make comparisons in the matching process. Step 202 generates identities that are likely to match.

Step 202 can generate sufficient groups such that if two identities match, they are included into a single block (e.g., of blocks of groups of near neighbors 304 provided below). Additionally, step 202 can ensure that said blocks are not too large (e.g., beyond a specified threshold). Step 202 can return a set of blocks of identities.

Figure 3:
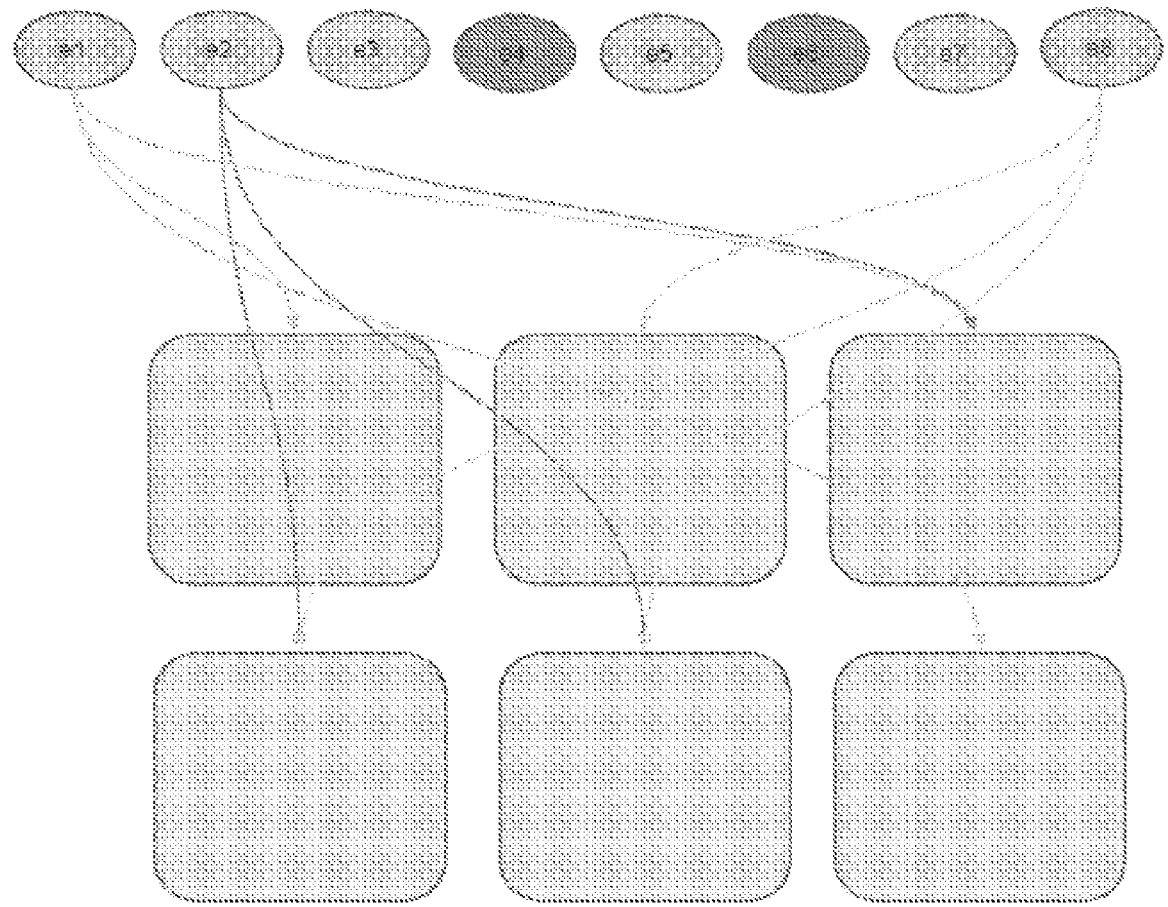
FIG. 3 illustrates an example schematic of a near-neighbors process, according to some embodiments.

FIG. 3 illustrates an example schematic of a near-neighbors process 300, according to some embodiments. This can be implemented by step 202. Step 202 can generate groups of near neighbors 304 of identities from entities E1-E8 302 that are likely to match. Step 202 generates likely matches, ensuring with high probability that true positives at least fall in one of the near neighbor groups.

A custom function can be plugged-in to generate near neighbors. For example, step 202 can generate a set of keys on each event and group them by the keys.

The generated key can be:

$nnf(e_1) = \{k_{11}, k_{12}, k_{13}, \ldots k_{1m}\}$
$nnf(e_2) = \{k_{21}, k_{22}, k_{23}, \ldots k_{2m}\}$
. . . .

The group by key can be:

$k_{11} \rightarrow \{e_1, e_6, e_7, \ldots\}$
. . . .

Returning to FIG. 2, in step 204, process 200 can implement pairwise matching. Step 204 uses a pre-built AI-based model and set of business rules on pairs of identities in a block. In this way, step 204 can infer whether the pair match or not. The custom model can be plugged-in. Step 204 returns all the matched pairs. Each AI-based model can be built for a specific type of real-world entity. For example, an AI-based model can match address, names, certain behavior, etc. to a customer ID based on a probability of a match. AI-based models use, for example, a random forest classifier, an artificial neural network and/or BERT encoding. These models can be trained on pairs identities. During training, the models can learn to distinguish differences across the pairs which can predict either a positive or negative match.

FIG. 4 illustrates an example of a schematic of pairwise matching, according to some embodiments. Step 204 can use a pre-built matching function based on an AI architecture. Examples of a pre-built matching function for a person entity can include, for example, matching of names, matching of addresses, etc. Step 204 can use a matching function that returns a probability of a matching given a pair of identity. Step 204 can use a plug-in of custom business matching rules and constraints. Step 204 can re-train a pre-trained model (e.g., transfer learning) and/or build a custom model using an entity resolution (ER) workbench. The ER workbench is an application of an AI-model to perform pairwise matching. As shown in FIG. 4, step 204 can compare entities with each near neighbor group (e.g. of groups of near neighbors 304) to generate probability of a match in set of matched pairs:

$mf(e_i, e_j)$ = probability of match

If $(mf(e_i, e_j))$ > threshold then a match.

Returning to the description of process 200, in step 206, process 200 can implement transitive closure. Step 206 can perform transitive closure on the matched pairs (e.g., using pairwise matching discussed above). Step 206 uses a distributed connected component algorithm to scale, in certain embodiments, to hundreds of millions of pairs. Step 206 returns the transitive closure of the matched pairs.

FIG. 5 illustrates an example schematic 500 of a transitive closure process, according to some embodiments. As shown, step 206 can apply transitive closure on each of the pairs of matched identities and create the clusters. In the illustrated example, there is a match between e1 and e2, a match between e2 and e3, and a match between e3 and e4. Therefore, e1, e2, e3, and e4 are all assigned to the same cluster because of the transitive relationship.

In step 208, process 200 can implement a cluster split (e.g., correlation clustering). The transitive closure can result in a cluster that is imperfect (e.g., contains conflict(s)). Transitive closure on pairs of matching entities can create clusters of entities that contain conflict. Step 208 can apply a two-disagreeing captain algorithm (e.g., see below) to split the cluster in order to resolve the conflicts. Step 208 can return clusters containing matched identities.

Figure 6:
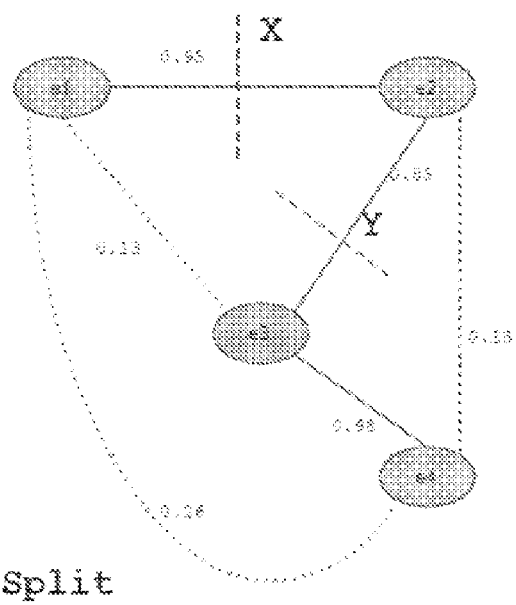
FIG. 6 illustrates an example schematic for cluster splitting, according to some embodiments.

FIG. 6 illustrates an example schematic 600 for cluster splitting, according to some embodiments. Schematic 600 can be used to implement step 208. In this example, step 208 applies constraints to split the cluster by using a two-disagreeing captain algorithm. The two-disagreeing captain algorithm chooses two captains. Each captain represents a cluster of the two clusters. The two-disagreeing captain algorithm greedily assigns other members in the original cluster to each of the captains. It then calculates an MLE of the two resultant clusters. When the resultant split maximizes the probability then a split is implemented. This process is repeated for every split till a split does not maximize the probability.

Returning to the description of FIG. 2, in step 210, process 200 can implement stable ID assignment. Matched clusters are assigned "Stable ID". A stable ID preserves the ID that was assigned in a previous ID assignment. In case of an ID split, step 210 minimizes the change in ID assignment. Step 210 returns a cluster with a stable ID.

Figure 7:
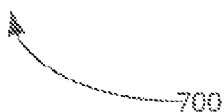
FIG. 7 illustrates an example schematic illustrating stable identifier (ID) assignment, according to some embodiments.

FIG. 7 illustrates an example schematic 700 illustrating a stable identifier (ID) assignment, according to some embodiments. Schematic 700 can be used to implement step 210. As shown, matched clusters are assigned a Stable ID.

A custom rule can be plugged in on which ID should be chosen. Step 210 can return clusters with stable IDs. Custom rules for ID assignments can be used to determine which previous ID to choose when an ID splits or when IDs are merged into one. For example, a custom rule for an ID merge or ID split can preserve the ID of the largest cluster.

In the example of FIG. 7, two runs A and B are performed. Between these two runs, it may be seen that the cluster in run A that contains e4 no longer contains e4 in run B. In addition, e8 and e9 are newly found in run B. The issue then is how to assign IDs based on the changes seen in run B. In this example, it would appear that ID1 from the first cluster of run A should still belong with the first cluster of run B, as only e4 changed. ID2 likewise remains with the second cluster, even though e9 was added in run B. The new cluster including e4 and e8 is assigned a new ID3.

Figure 8:
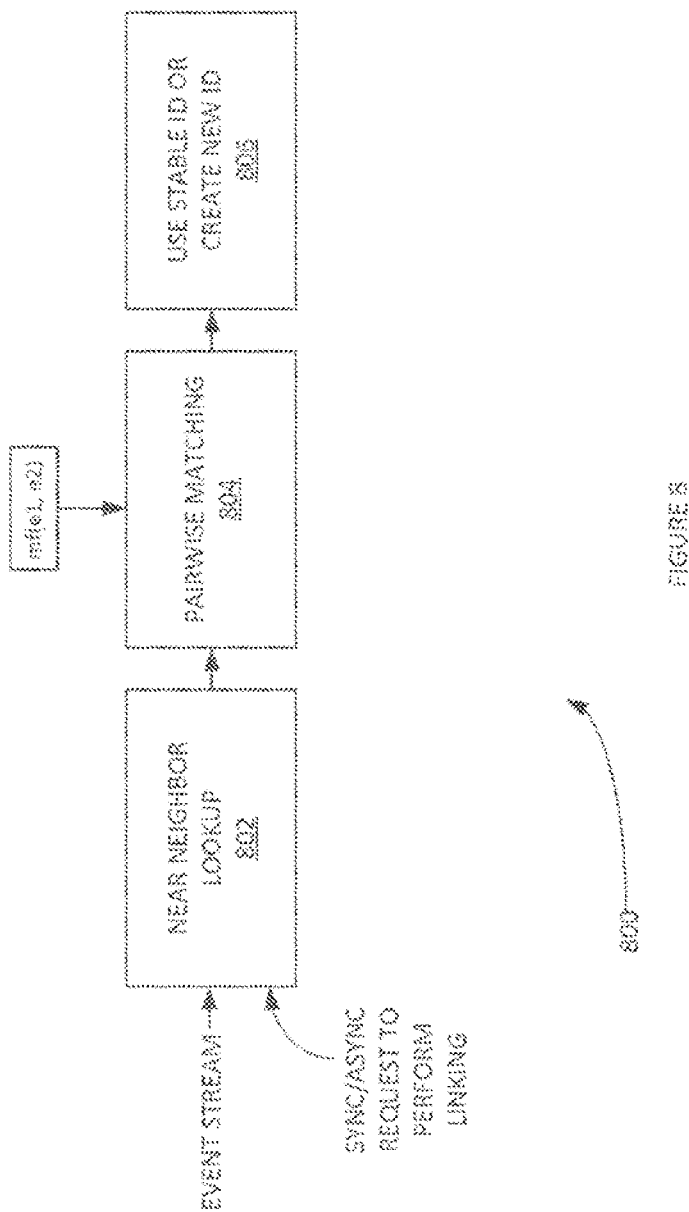
FIG. 8 illustrates an example process for real-time/on-demand linking (RTL), according to some embodiments.

FIG. 8 illustrates an example process 800 for real-time/on-demand linking (RTL), according to some embodiments. Unlike with high-throughput matching, process 800 may not consider the secondary (or tertiary effects) of matching. A secondary impact of a matching is when a matching may affect other matching previously performed. In step 802, process 800 can implement a near-neighbor lookup. Step 802 can receive and utilize an event stream data and/or a synchronous/asynchronous request to perform linking. In step 804, process 800 can implement pairwise matching. In step 806, process 800 can use a stable ID or create a new ID.

Process 800 can implement real-time linking by linking identity(s) in a low latency context (e.g., in milliseconds). Process 800 may, in some embodiments, not consider the secondary impact of a match of real-time events but guarantees the correctness of the match. After the lambda switch, when real-time events received until the switch are fed into a high-throughput linking, then the secondary and subsequent impacts can be considered.

Figure 9:
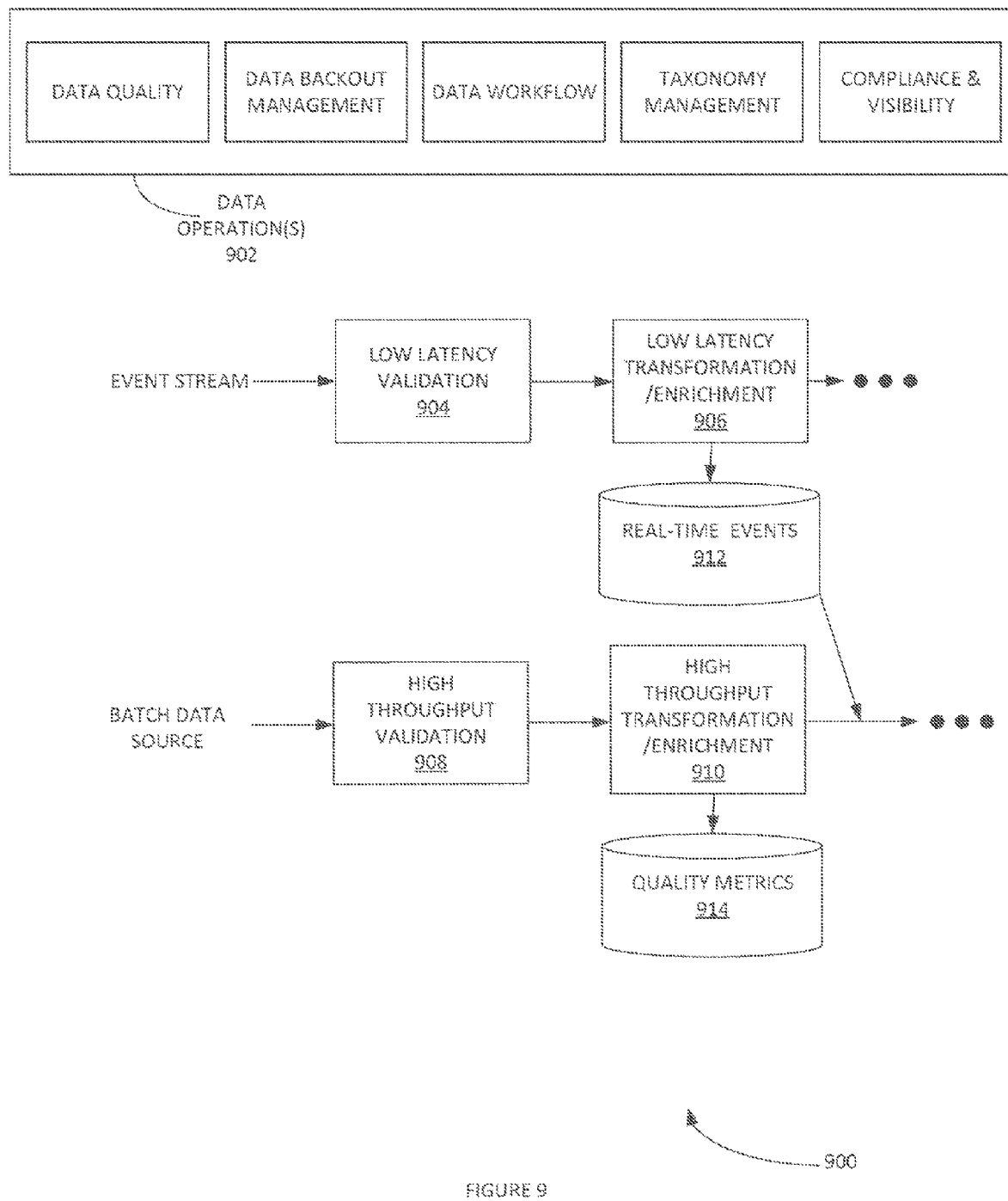
FIG. 9 illustrates an example data management process for use herein, according to some embodiments.

FIG. 9 illustrates an example data management process 900 according to some embodiments. Data management process 900 can be used to minimize data preparation. Data management process 900 can use data operations management module 902. Data operations management module 902 can include modules for, among other things, data quality, data backout management, data workflow, taxonomy management, compliance, and visibility, etc.

More specifically, in step 904, process 900 can implement low latency validation on the events stream. In step 906, process 900 can implement low latency transformation/enrichment. This can generate real-time events 912.

In step 908, process 900 can implement high-throughput validation. The output of step 908 can be fed into step 910. In step 910 process 900 can implement a high-throughput transformation/enrichment. High-throughput transformation/enrichment can provide output that is integrated with real-time events 912. High-throughput transformation/enrichment can also generate quality metrics 914.

Data management process 900 can also provide for implementing, among other things, data quality management, data backup management, legal compliance workflows, compliance, and visibility protocols, etc.

FIG. 10 illustrates an example schematic 1000 of a composite profile creation, according to some embodiments. As shown, an SQL-like Entity Query Language (EQL) can be used to calculate various attributes and/or properties of the entity. All the matched attributes of the entity can be utilized. It is noted that EQL has a rich set of predefined functions to calculate entity specific attributes (e.g. MOST_FREQUENT, MONTHLY, LAST_ACTIVE etc.). Additionally, machine learning (ML) inference functions can be used in EQL as a regular function.

Figure 11:
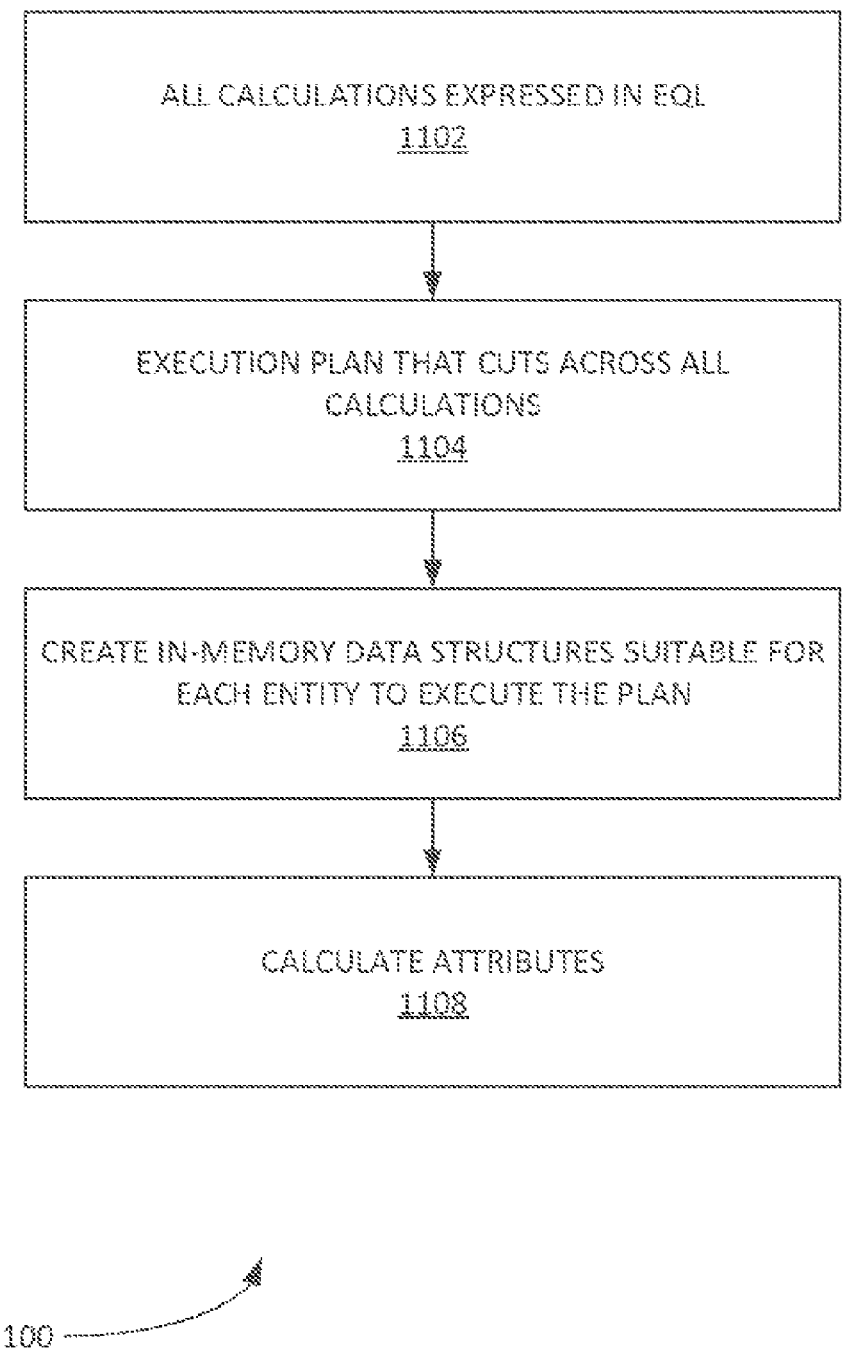
FIG. 11 illustrates an example process for composite profile creation, according to some embodiments.

FIG. 11 illustrates an example process 1100 for composite profile creation, according to some embodiments. In step 1102, all calculations are expressed in an EQL format. In step 1104, process 1100 can implement an execution plan that cuts across all calculations. In step 1106, process 1100 can create in-memory data structures suitable for each entity to execute the plan. In step 1108, process 1100 can calculate the relevant attributes.

Entity Database Management System

An entity database management system is provided to handle and store entity data. The entity database management system utilizes an entity-oriented database, rather than a record-oriented database such as a traditional SQL database. The entity database management system can be used to help enterprises resolve, manage, and query entities. The entity database management system forms a superset of the components described above in an overall system for entity resolution.

Figure 12:
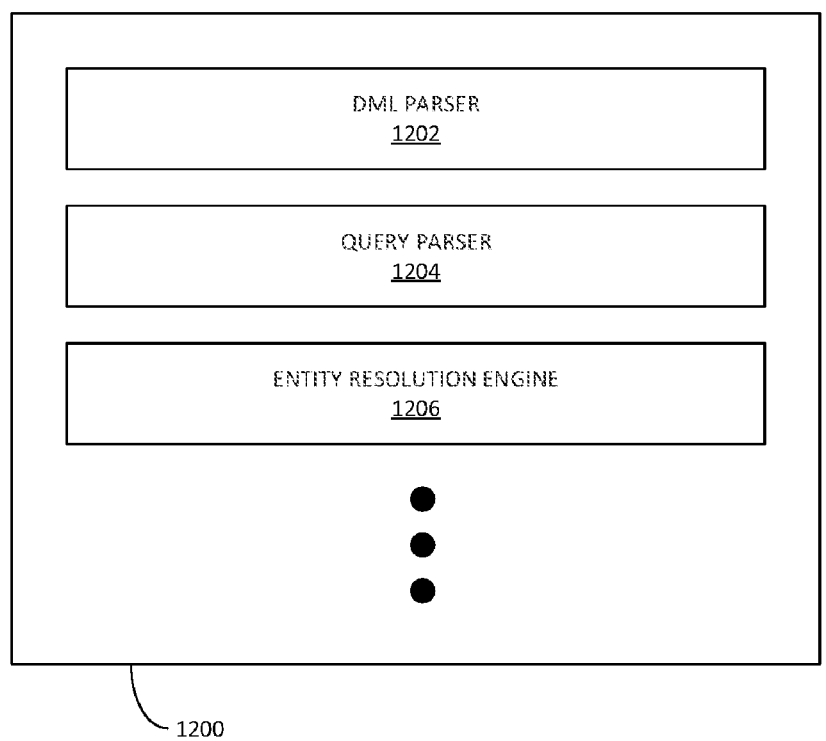
FIG. 12 illustrates an example entity database architecture, according to some embodiments.

FIG. 12 illustrates an example architecture of an entity database 1200, according to some embodiments. Entity database 1200 can be utilized in the entity database management system. Entity database 1200 can include DML parser 1202. DML parser 1202 parses statements to load data into the Entity Database. The DML statements are declarative instructions used to create an entity and to load data into entity database 1200. The loading requires the resolution of entities (e.g., see below). DML parser 1202 converts parsed statements into a pipeline of instructions. These instructions are then passed to the entity resolution engine 1206 for execution.

FIG. 13 illustrates an example DML grammar 1300, according to some embodiments. DML grammar can be used to define a statement of entity database 1200.

Entity database 1200 can include query parser 1204. Query parser 1204 parses query statements to perform a query for an entity. The query statements are declarative instructions containing entity traits. Entity resolution engine 1206 then runs these instructions to perform matching and returns matched entities. FIG. 14 illustrates an example query-statement grammar 1400, according to some embodiments.

Figure 15:
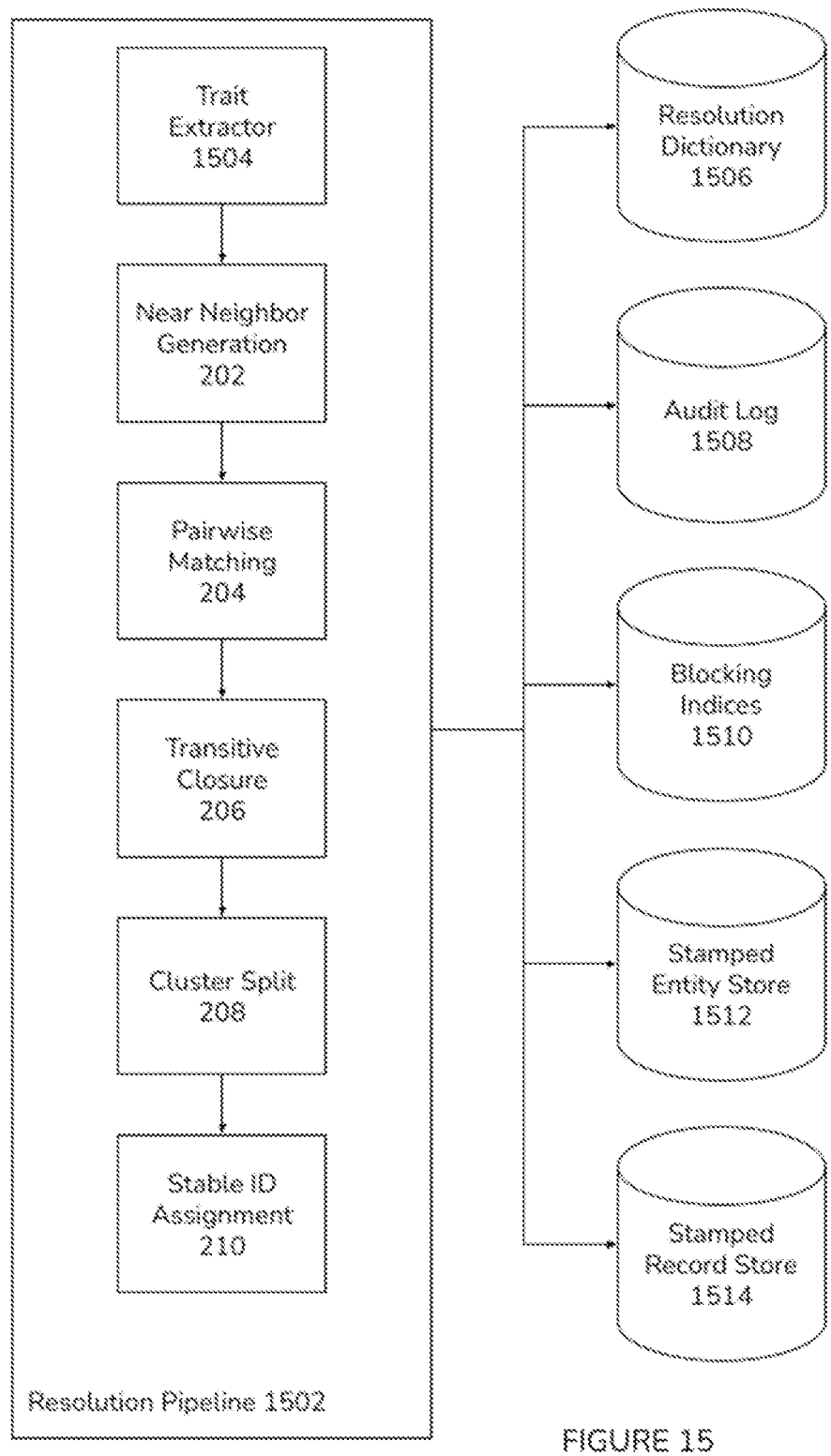
FIG. 15 illustrates an example set of components of an entity resolution engine, according to some embodiments.

Entity database 1200 can include entity resolution engine 1206. Entity resolution engine 1206 is responsible for creating entities, resolving, and performing queries. FIG. 15 illustrates an example set of components of an entity resolution engine 1206, according to some embodiments. This includes resolution pipeline 1502.

Resolution pipeline 1502 includes trait extractor 1504. Trait extractor 1504 extracts traits from each record and performs de-duplication, that is, removes duplicate records as they come into resolution pipeline 1502. Processing them proceeds through near neighbor generation 202, pairwise matching 204, transitive closure 206, cluster split 208, and stable ID assignment 210 as explained above.

Resolution pipeline 1502 executes the DML resolve statements from DML parser 1202 to perform resolution and populating the stamped entity store 1512, stamped record store 1514, and blocking indices 1510. These are stored in their own database storage areas or in different areas of one or more physical storage areas. The resolution pipeline 1502 executes the query statement.

Resolution dictionary 1506 maintains metadata information about the resolved entities and various metrics. Audit log 1508 maintains the audit of all the activities including resolution and query. Blocking indices 1510 maintains the blocking keys and references to every block. Stamped entity store 1512 stores all of the resolved entities and associated identifiers. It also maintains the lineage of identifiers including identifier history, identifier merges, and identifier splits. Stamped record store 1514 stores all the records and their associated identifiers.

Example Computer Architecture and Systems

Figure 16:
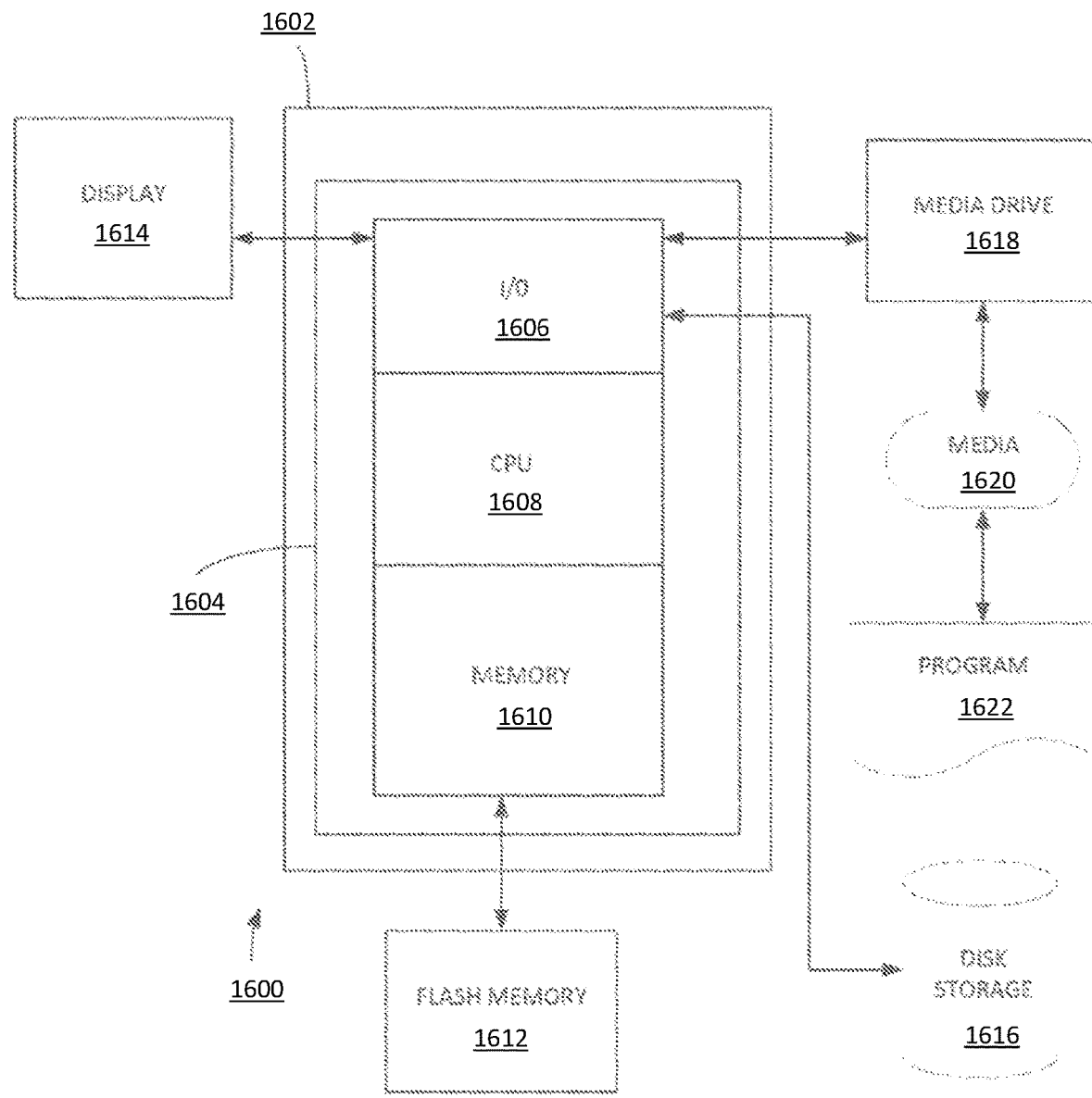
FIG. 16 is a block diagram of a sample computing environment that can be utilized to implement various embodiments.

FIG. 16 depicts an exemplary computing system 1600 that can be configured to perform any one of the processes provided herein. In this context, computing system 1600 may include, for example, a processor, memory, storage, and I/O devices (e.g., monitor, keyboard, disk drive, Internet connection, etc.). However, computing system 1600 may include circuitry or other specialized hardware for carrying out some or all aspects of the processes. In some operational settings, computing system 1600 may be configured as a system that includes one or more units, each of which is configured to carry out some aspects of the processes either in software, hardware, or some combination thereof.

The main system 1602 includes a motherboard 1604 having an I/O section 1606, one or more central processing units (CPUs) or processors 1608, and a memory section 1610, which may have a flash memory card 1612 related to it. The CPU 1608 may be a multiprocessor system. The 1/O section 1606 can be connected to a display 1614, a keyboard and/or other user input (not shown), a disk storage unit 1616, and a media drive unit 1618. The media drive unit 1618 can read/write a computer-readable medium 1620, which can contain programs 1622 and/or data. Computing system 1600 can include a web browser. Moreover, it is noted that computing system 1600 can be configured to include additional systems in order to fulfill various functionalities. Computing system 1600 can communicate with other computing devices based on various computer communication protocols such as Wi-Fi, Bluetooth® (and/or other standards for exchanging data over short distances including those using short-wavelength radio transmissions), USB, Ethernet, cellular, etc. Computing system 1600 may be implemented as a local system or a cloud-based system, in the latter case operating potentially as a virtual computing system within a cloud-computing environment.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. An entity database system, comprising:
   at least one hardware processor coupled to a memory storing instructions;
   a data manipulation language (DML) parser configured to cause the at least one hardware processor to parse statements into a pipeline of instructions to read set of records (events) and resolve, canonicalize, and persist into a data store;
   a query parser configured to cause the at least one hardware processor to perform a query for an entity within the entity database, wherein each query comprises at least one declarative instruction comprising an entity trait;
   an entity resolution engine configured to receive instructions from the DML parser and to receive queries from the query parser and to cause the at least one hardware processor to return at least one matched entity, wherein the entity resolution engine comprises:
      a trait extractor configured to extract traits from a record received at the DML parser or the query parser and to extract at least one entity trait from the record;
      a near neighbor generator configured to group two identities into a single block when the two identities match;
      a pairwise match subroutine configured to match at least one particular trait for each entity based on a probability of a match exceeding a match threshold and return at least one matched pair;
      a transitive closure subroutine configured to perform transitive closure on each matched pair returned from the pairwise match subroutine to return entity clusters;
      a cluster split subroutine configured to split entity clusters from the transitive closure subroutine when the split entity clusters contain at least one conflict; and a stable identifier (ID) assignment subroutine configured to preserve an ID assigned in a previous ID assignment unless a split has occurred, and to minimize a change in ID assignment when a split occurs and a new ID must be assigned.

2. The entity database of claim 1, wherein the near neighbor generator is further configured to limit a size of each block to a specified threshold.

3. The entity database of claim 1, wherein the pairwise match subroutine comprises at least one pre-built artificial intelligence (AI) based mode and set of business rules on pairs of identities in the blocks.

4. The entity database of claim 3, wherein each of the at least one pre-built AI-based model is built for a specific type of real-world entity.

5. The entity database of claim 1, wherein the cluster split subroutine is configured to apply a two-disagreeing captain algorithm to the entity clusters in order to determine whether to split each of the entity clusters.

6. The entity database of claim 1, further comprising a resolution dictionary configured to receive and store metadata concerning entities resolved by the entity resolution engine.

7. The entity database of claim 6, further comprising a stamped entity store configured to receive and store all of the resolved entities and associated identifiers from the entity resolution engine.

8. The entity database of claim 7, further comprising a stamped record store configured to receive and store records and associated identifiers from the entity resolution engine.

9. The entity database of claim 8, further comprising a blocking indices store configured to receive and store a plurality of blocking keys and references to each block from the entity resolution engine.

10. A method for operating an entity database, comprising:
- at a data manipulation language (DML) parser, parsing statements into a pipeline of instructions to read set of records (events) and resolve, canonicalize, and persist into a data store;
- at a query parser, performing a query for an entity within the entity database, wherein each query comprises at least one declarative instruction comprising an entity trait;
- at an entity resolution engine, receiving instructions from the DML parser, receiving queries from the query parser, and returning at least one matched entity, wherein the step of returning at least one matched entity comprises:
  - at a trait extractor, extracting traits from a record received at the DML parser or the query parser and extracting at least one entity trait from the record;
  - at a near neighbor generator, grouping two identities into a single block when the two identities match;
  - at a pairwise match subroutine, matching at least one particular trait for each entity based on a probability of a match exceeding a match threshold and returning at least one matched pair;
  - at a transitive closure subroutine, performing transitive closure on each matched pair returned from the pairwise match subroutine to return entity clusters;
  - at cluster split subroutine, splitting entity clusters from the transitive closure subroutine when the split entity clusters contain at least one conflict; and
  - at a stable identifier (ID) assignment subroutine, preserving an ID assigned in a previous ID assignment unless a split has occurred, and minimizing a change in ID assignment when a split occurs and a new ID must be assigned.

11. The method for operating an entity database of claim 10, wherein the step of grouping two identities into a single block when the two identities match limits the size of each single block to a specified threshold.

12. The method of operating an entity database of claim 10, wherein matching at least one particular trait for each entity based on a probability of a match exceeding a match threshold utilizes a plurality of pre-built artificial intelligence (AI) based models on pairs of identities in the blocks, wherein each pre-built AI-based model is built for a different type of real-world entity.

13. The method for operating an entity database of claim 10, wherein the step of splitting entity clusters applies a two-disagreeing captain algorithm to the entity clusters.

14. The method for operating an entity database of claim 10, further comprising the step of storing all of the resolved entities and associated identifiers in a stamped entity store.

15. The method for operating an entity database of claim 14, further comprising the step of storing records and associated identifiers in a stamped record store.

* * * * *